United States Patent
Chiu et al.

(10) Patent No.: US 8,439,547 B2
(45) Date of Patent: May 14, 2013

(54) BACKLIGHT MODULE

(75) Inventors: Kuan-Her Chiu, Taipei (TW); Irene Chen, Taipei (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 451 days.

(21) Appl. No.: 12/729,198

(22) Filed: Mar. 22, 2010

(65) Prior Publication Data

US 2010/0271807 A1    Oct. 28, 2010

(30) Foreign Application Priority Data

Apr. 22, 2009    (TW) ................................ 98113271 A

(51) Int. Cl.
*G02F 1/13357* (2006.01)
(52) U.S. Cl.
USPC ............................................ 362/612; 349/62
(58) Field of Classification Search .................. 362/600, 362/609–627
See application file for complete search history.

(56) References Cited

U.S. PATENT DOCUMENTS

| 2006/0072314 A1* | 4/2006 | Rains ............................. 362/231 |
| 2007/0115648 A1* | 5/2007 | Huang ............................. 362/27 |
| 2008/0002421 A1* | 1/2008 | Tamaki et al. ................. 362/552 |
| 2008/0205053 A1* | 8/2008 | Rains et al. .................... 362/231 |
| 2008/0291692 A1* | 11/2008 | Kuo et al. ...................... 362/602 |
| 2009/0109368 A1* | 4/2009 | Watanabe et al. ............... 349/58 |
| 2009/0284682 A1* | 11/2009 | Lee et al. ........................ 349/62 |

FOREIGN PATENT DOCUMENTS

| TW | 592306 | 6/2004 |
| TW | M287446 | 2/2006 |
| TW | 200912463 A | 3/2009 |

* cited by examiner

*Primary Examiner* — Anh Mai
*Assistant Examiner* — Elmito Breval
(74) *Attorney, Agent, or Firm* — Altis Law Group, Inc.

(57) ABSTRACT

An exemplary illuminating apparatus includes a light guiding plate, a light source facing a light input surface of the light guiding plate, and a complementary color element adjacent to the light source. The light source comprises a number of LEDs which emit light with at least two wavelengths. The at least two wavelengths light mix with each other to gain a white light. The complementary color element is configured for receiving light emitted from adjacent, outmost LED and converting the light into white light. The white light is reflected by the complementary color element and emits from the light guiding plate through the light output surface.

4 Claims, 8 Drawing Sheets

BACKLIGHT MODULE

BACKGROUND

1. Technical Field

The present disclosure generally relates to backlight modules, and particularly to a backlight module with satisfied light uniformity.

2. Discussion of Related Art

A typical LCD device includes a liquid crystal display panel, and a backlight module mounted behind the liquid crystal display panel. The backlight module mainly comprises a light source and a light guiding plate. The light guiding plate is generally made of a transparent acrylic plastic, and is used for guiding the light beams emitted by the light source in order to uniformly illuminate the liquid crystal display panel.

Nowadays, the light source of the backlight module includes red LEDs, green LEDs, and blue LEDs arranged on a substrate. White light is obtained by mixing light emitted by the red, green, and blue LEDs. However, the LEDs arranged on lateral sides of the substrate couldn't thoroughly mix. Light output from a light output surface of the light guiding plate may be non-uniform. In order to mix the light emitted by the light beams uniformly from the light output surface, a wavelength-selective reflectors is provided at a front of the light source to reflective light with the same colors; therefore, it can improve the mixing degree of the light via enhancing the distance that the light travels. Alternatively, reflectors are provided at lateral sides of the light guiding plate to reflect light emitted by the outmost light source to center area, and mix with light emitted by the center light source to obtain white light. Therefore, it can improve the light uniformity. However, because the light reflected by the reflectors for many times, the luminous intensity of the beams may be lessened to an unacceptable level.

Therefore, what is needed is a backlight module to overcome the above described shortcomings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION OF EMBODIMENTS

Reference will now be made to the drawings to describe various embodiments of the present backlight module in detail.

Figure 1:
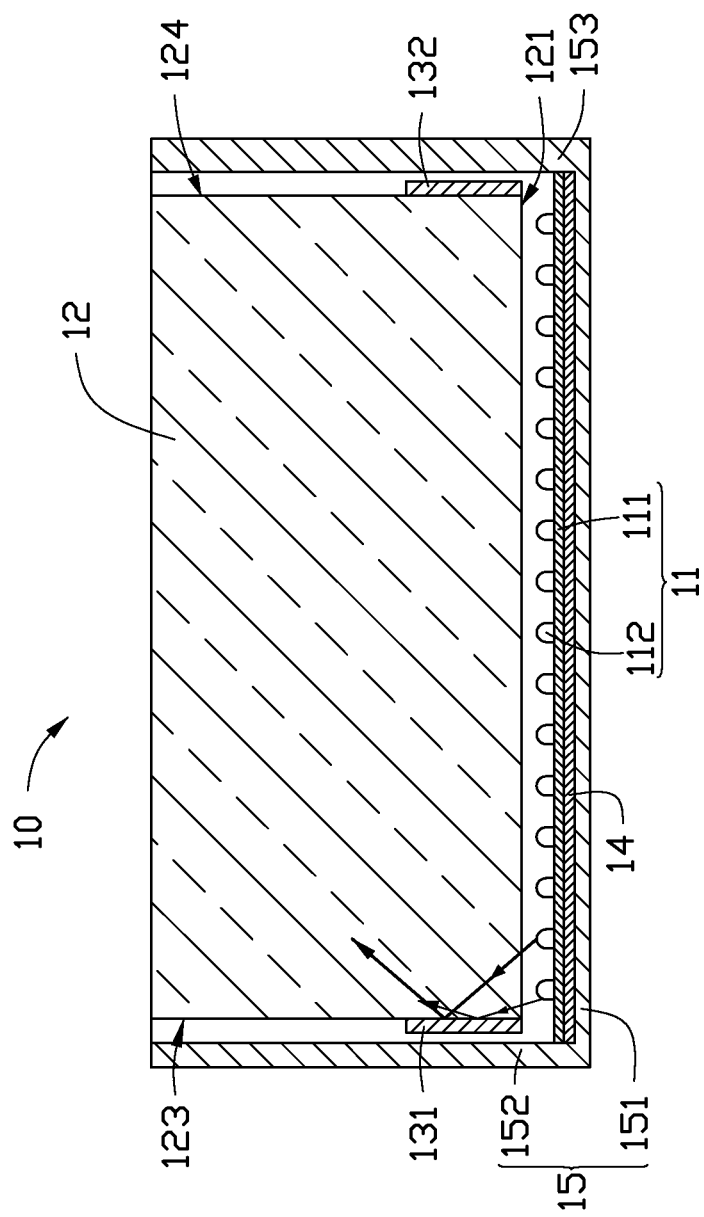
FIG. 1 is a cross-sectional view of an edge-lighting type backlight module, in accordance with a first embodiment of the present disclosure.
Figure 2:
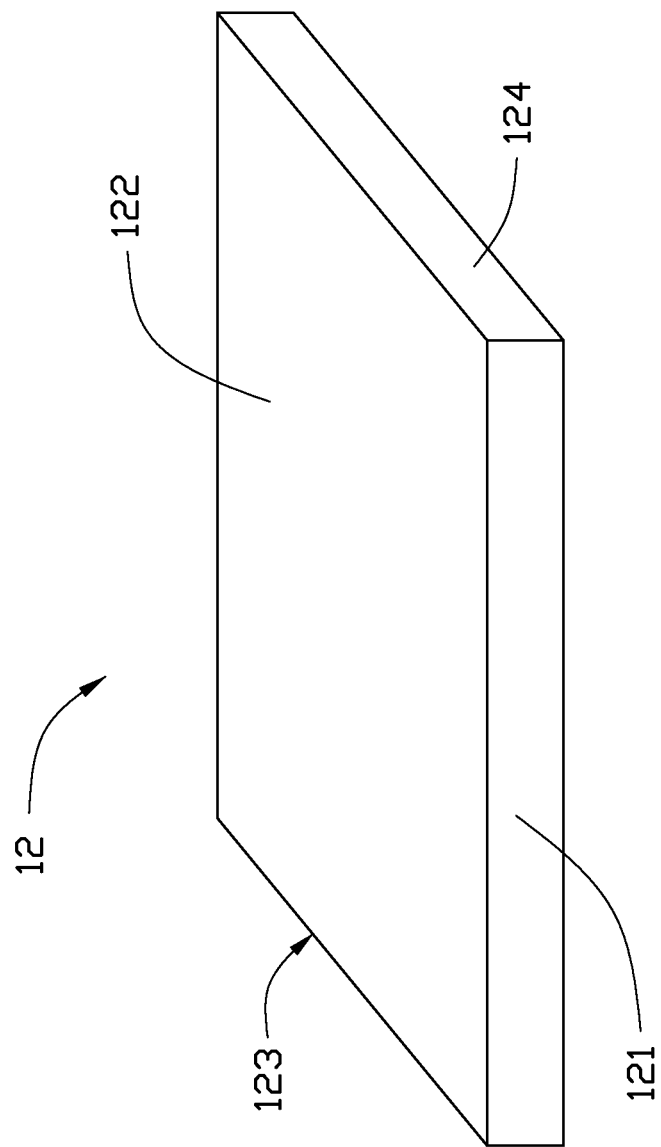
FIG. 2 is an isometric view of a light guiding plate of the backlight module of FIG. 1.
Figure 3:
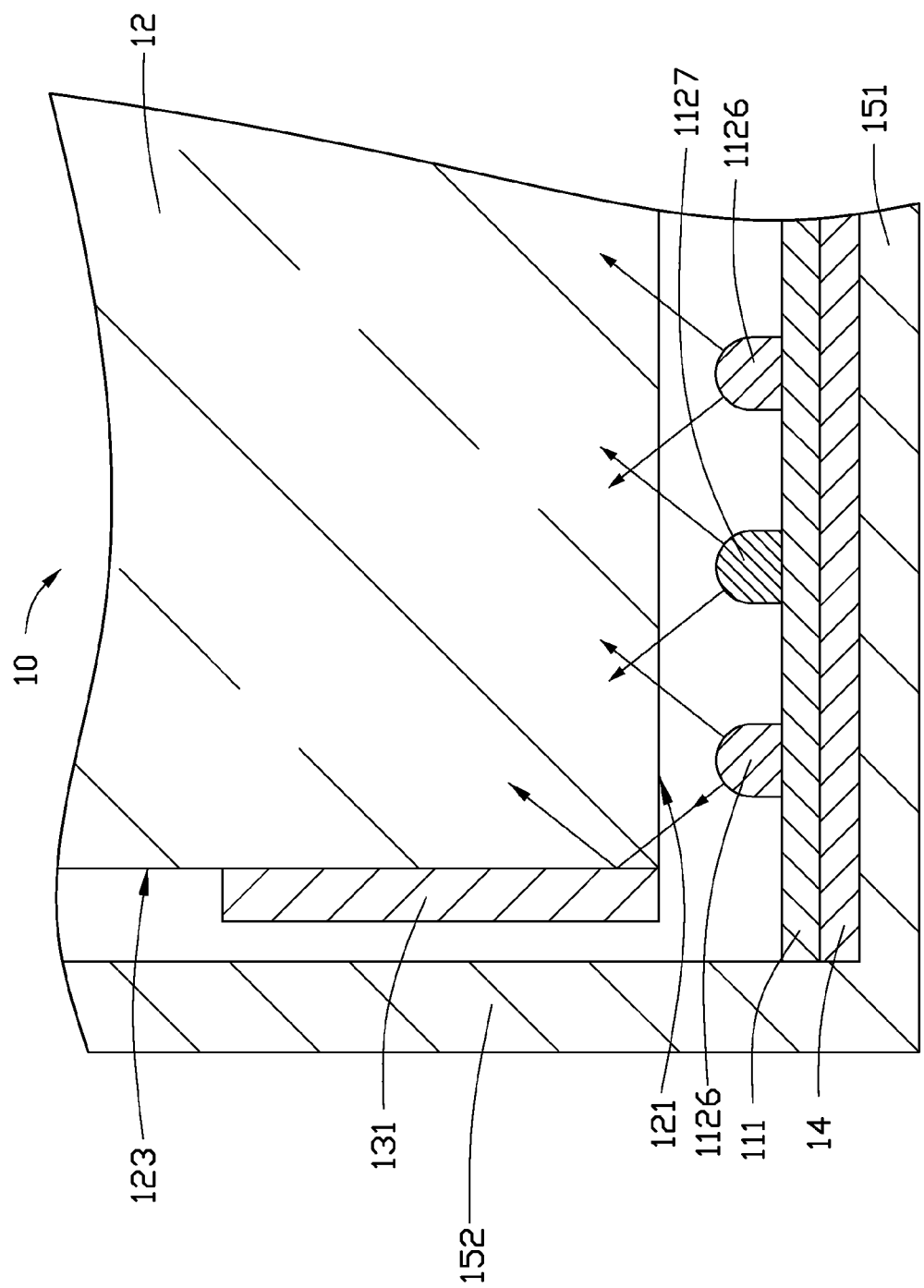
FIG. 3 is a partially enlarged view of the backlight module of FIG. 1.

Referring to FIGS. 1-3, an edge-lighting type backlight module 10, in accordance with a first embodiment, includes an enclosure 15, a light source 11 received in the enclosure 15, a light guiding plate 12 facing the light source 11, two complementary color elements 131, 132 located at two corresponding side surfaces of the light guiding plate 12, and a heat dissipation module 14 engaging with the light source 11.

The enclosure 15 includes a base 151 and two opposite supporting portions 152, 153 extending from two lateral ends of the base 151. In the present embodiment, the supporting portions 152, 153 are perpendicular to the base 151 of the enclosure 15.

The light source 11 is mounted on the base 151 of the enclosure 15. The light source 11 includes a substrate 111 and a number of light emitting diodes (LEDs) 112 arranged on the substrate 111 in a horizontal line and spaced from each other at equal intervals. In the present embodiment, the LEDs 112 include at least one type of first-wavelength LEDs 1126 and at least one type of second-wavelength LEDs 1127 alternately arranged on the substrate 111. The first wavelength is different from the second wavelength. A first-wavelength light emitted from the first-wavelength LEDs 1126 and a second-wavelength light emitted from the second-wavelength LEDs 1127 mix with each other thereby to emit white light. In the present embodiment, two first-wavelength LEDs 1126 are respectively arranged on the lateral sides of the substrate 111.

The light guiding plate 12 is received in the enclosure 15. The light guiding plate 12 has a generally rectangular shape with a uniform thickness. The light guiding plate 12 includes a light input surface 121, a light output surface 122 adjacent to and perpendicular to the light input surface 121, and two opposite side surfaces 123, 124 adjacent to the light input surface 121 and the light output surface 122. The light input surface 121 faces the LEDs 112. The side surfaces 123, 124 respectively face the supporting portions 152, 153 of the enclosure 15. In the present embodiment, the side surfaces 123, 124 are parallel to corresponding supporting portions 152, 153 of the enclosure 15.

The complementary color elements 131, 132 are respectively located at the side surfaces 123, 124 of the light guiding plate 12. The complementary color elements 131, 132 each have a color complementing the color of the light emitted by an adjacent, outmost LED 112 (i.e., the first-wavelength LED 1126 at a corresponding lateral side of the substrate 111). In the present embodiment, the complementary color elements 131, 132 are complementary color reflective films. The length of the complementary color elements 131, 132 is less than that of the side surfaces 123, 124 of the light guiding plate 12. One end of each the complementary color elements 131, 132 are substantially adjacent to the light input surface 121 of the light guiding plate 12.

The complementary color element 131 is configured for receiving the first-wavelength light emitted from the first-wavelength LEDs 1126 arranged on the left end of the substrate 111 and converting the light into white light. Therefore, the white light is reflected by the complementary color elements 131 and emits from the light guiding plate through the light output surface 122. In addition, the complementary color element 132 is configured for receiving the first-wavelength light emitted from the first-wavelength LED 1126 arranged on the right end of the substrate 111 and converting the light into white light; therefore, the white light is reflected by the complementary color elements 132 and emits from the light guiding plate 12 through the light output surface 122. For example, when the LED 1126 arranged on the left end of the substrate 111 is blue LED, the complementary color element 131 is selected from a yellow reflective film. In one embodiment, the LED 1126 arranged on the right end of the substrate 111 is yellow LED, and the complementary color element 132 is blue reflective film. In another embodiment, the outmost LED 1126 arranged on the substrate 111 can be selected from green LED or red LED, and the corresponding complementary color elements 131, 132 can be selected from purple or pale bluish green reflective film, respectively.

The heat dissipation module 14 is engaged with the substrate 111 of the light source 11 and configured for dissipating heat generated by LEDs 112 to environment air. In the present embodiment, the heat dissipation module 14 includes a number of sinks.

Since the backlight module 10 has complementary color elements 131, 132 which have complementary color to the color of the light emitted by an adjacent, outmost LED 1126, the light output from the light output surface 122 of the light guiding plate 12 is uniform.

Figure 4:
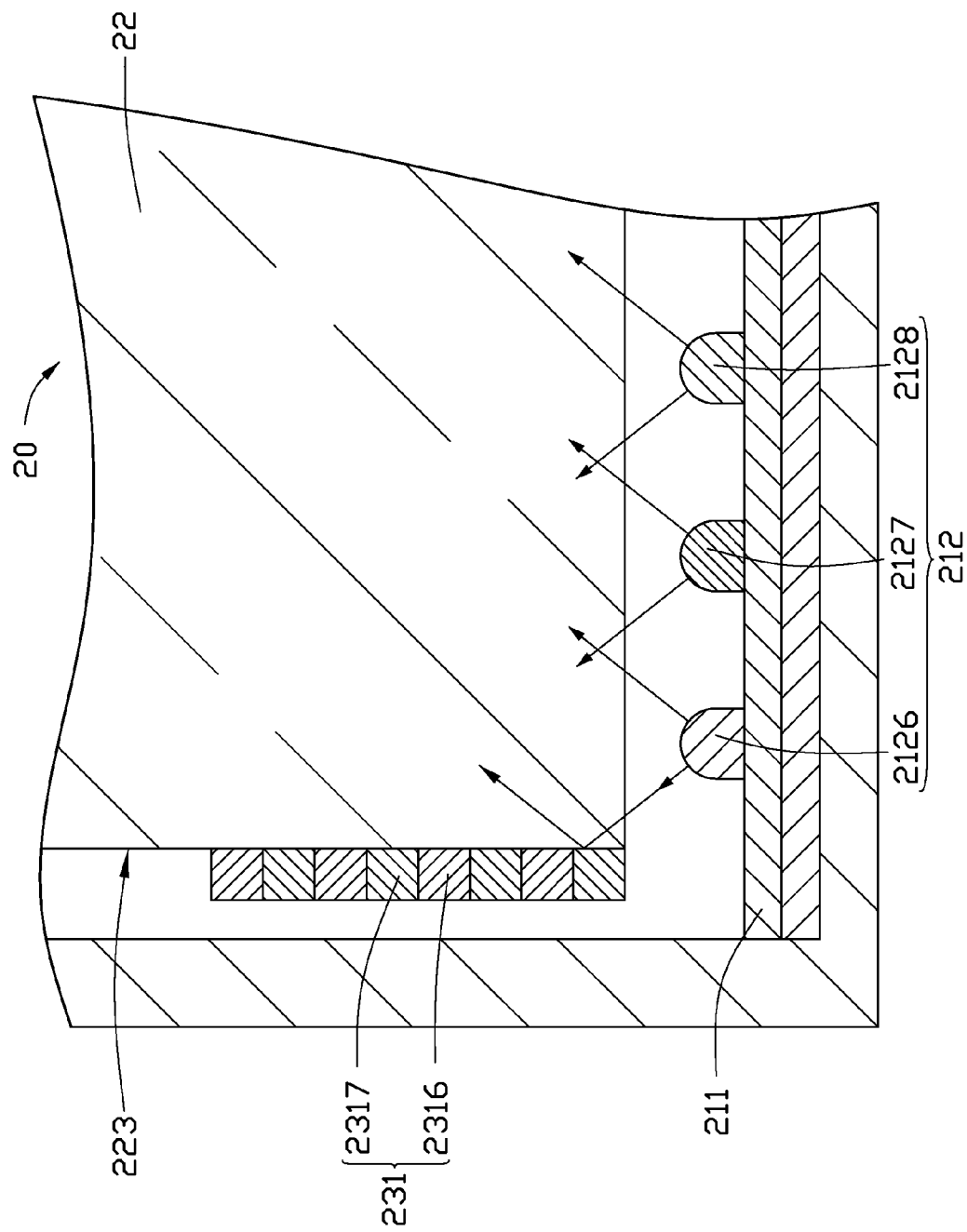
FIG. 4 is a partially cross-sectional view of an edge-lighting type backlight module, in accordance with a second embodiment of the present disclosure.

Referring to FIG. 4, an edge-lighting type backlight module 20 according to a second embodiment is shown. The backlight module 20 includes two complementary color elements, one is complementary color element 231 and the other one is not shown. The complementary color element 231 is located at a left side surface 223 of the light guiding plate 22. The other complementary color element (not shown) is located at a right side surface of the light guiding plate 22, which is symmetrically opposite to the complementary color element 231. Differing from the backlight module 10, the LEDs 212 of the backlight module 20 include a number of first-wavelength LEDs 2126, a number of second-wavelength LEDs 2127 and a number of third-wavelength LEDs 2128. The complementary color element 231 includes a number of first complementary color zones 2316 and a number of second complementary color zones 2317 arranged alternately along a vertical line.

The first-wavelength LED 2126, the second-wavelength LED 2127 and the third-wavelength LED 2128 are different from each other, and arranged on the substrate 211 in a horizontal line. A first-wavelength light emitted from the first-wavelength LEDs 2126, a second-wavelength light emitted from the second-wavelength LEDs 2127, and a third-wavelength light emitted from the third-wavelength LEDs 2128 mix with each other and emit white light. In the present embodiment, the first-wavelength LEDs 2126, the second-wavelength LEDs 2127 and the third-wavelength LEDs 2128 emit red, green, blue light, respectively.

The first and second complementary color zones 2316, 2317 are alternately arranged and evenly spaced apart from each other. For example, the first-wavelength LED 2126 is a red LED, the first complementary color zones 2316 are green reflective films and the second complementary color zones 2317 are blue reflective films. Therefore, red light emitted from the red LED 2126 incidents to the first, second complementary color zones 2316, 2317. The first, second complementary color zones 2316, 2317 cooperatively convert the light into white light and reflect the white light into the light guide plate 22 from the side surface 223, and then the white light leaves the light guiding plate 22 from the light output surface 122. It can be understood that, in the present embodiment, the complementary color element 231 can include more than two complementary color zones, or only includes a complementary color zone which is same as the complementary color element 131 in the first embodiment.

Figure 5:
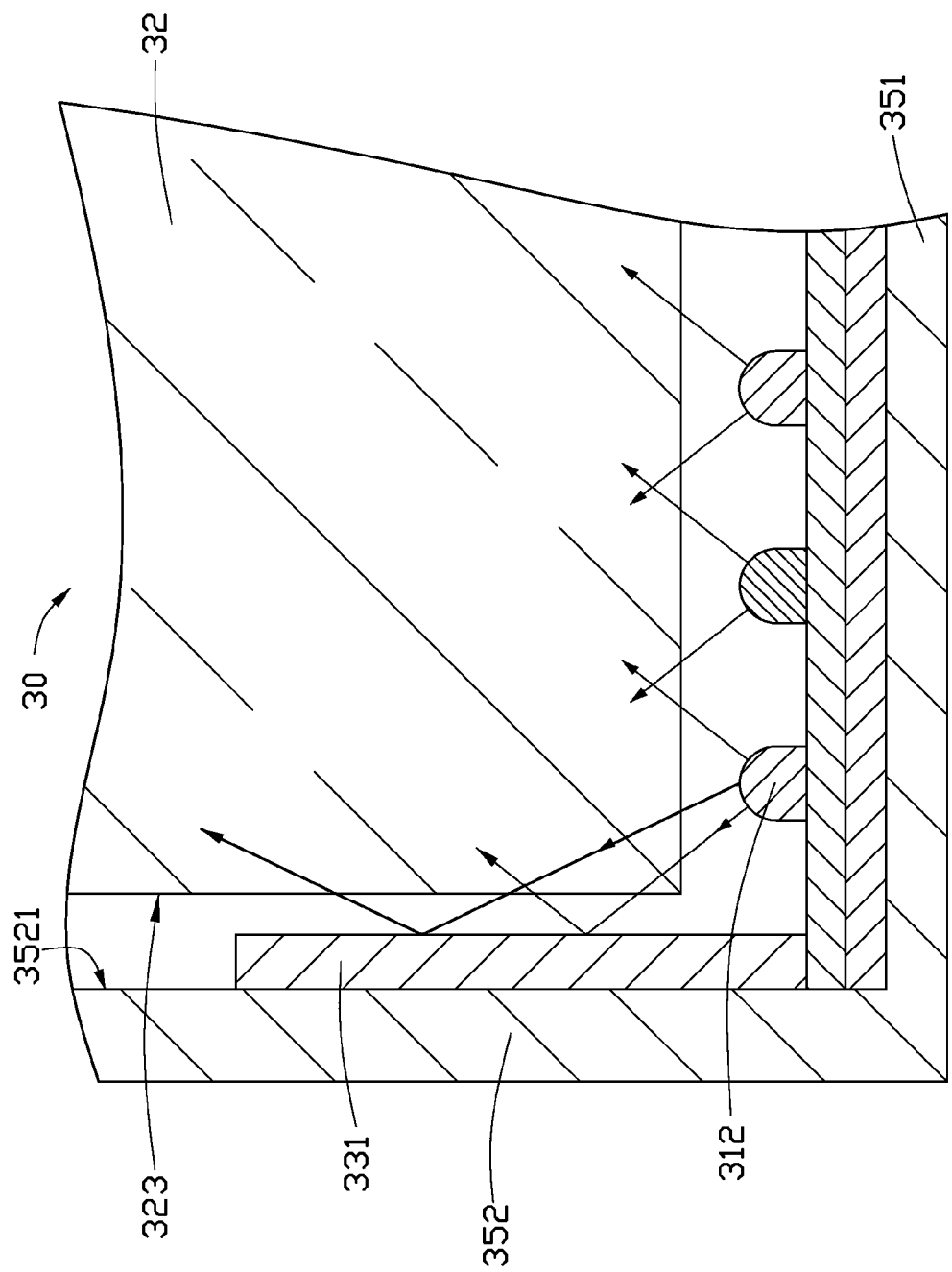
FIG. 5 is a partially cross-sectional view of an edge-lighting type backlight module, in accordance with a third embodiment of the present disclosure.

Referring to FIG. 5, an edge-lighting type backlight module 30 according to a third embodiment is shown. The backlight module 30 includes two complementary color elements, one is complementary color element 331, and the other one is not shown. Different from the backlight module 10 according to the first embodiment, the complementary color element 331 of the backlight module 30 is arranged on a left inner surface 3521 of a supporting portion 352 of an enclosure of the backlight module 30. The other complementary color element (not shown) is symmetrically opposite to the complementary color element 331, which is arranged on a right inner surface of another supporting portion 352 of the enclosure. In the present embodiment, the supporting portions 352 are perpendicular to the base 351, and parallel to the side surface 323 of the light guiding plate 32. The complementary color element 331 has a color complementary to the color of the light emitted by a corresponding adjacent, outmost LED 312.

Figure 6:
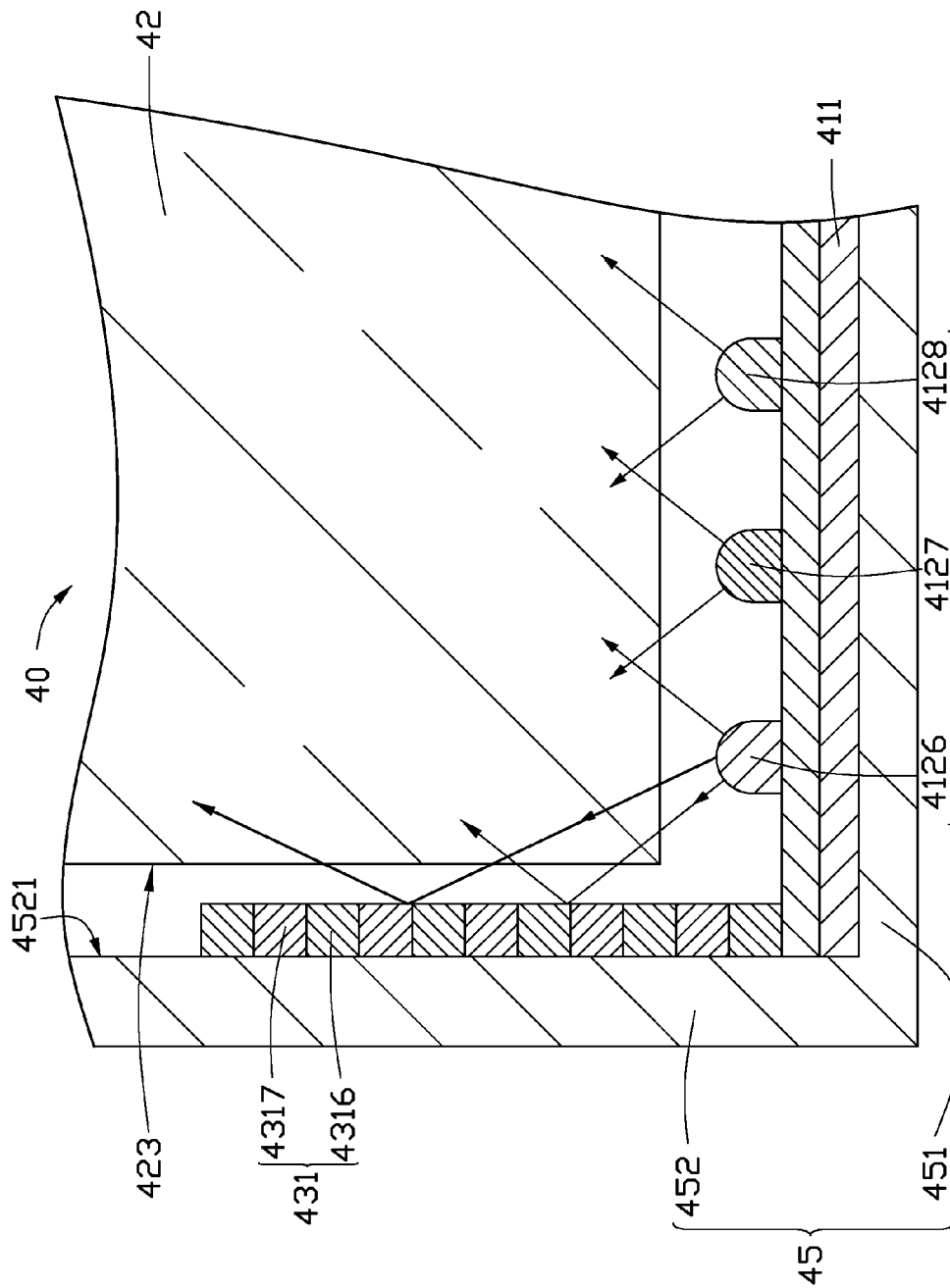
FIG. 6 is a partially cross-sectional view of an edge-lighting type backlight module, in accordance with a fourth embodiment of the present disclosure.

Referring to FIG. 6, an edge-lighting type backlight module 40 according to a fourth embodiment is shown, differing from the backlight module 30 in the inclusion of the LEDs 412 which include a first-wavelength LED 4126, a second-wavelength LED 4127 and a third-wavelength LED 4128. The complementary color element 431 is arranged on an enclosure 45 of the backlight module, and includes a number of complementary color zones arranged alternately along a vertical line.

The first-wavelength LED 4126, the second-wavelength LED 4127 and the third-wavelength LED 4128 are different from each other, and are arranged on the substrate 411 in a horizontal line. Light emitted from the first-wavelength LED 4126, the second-wavelength LED 4127 and the third-wavelength LED 4128 mix with each other to produce white light. In the present embodiment, the first-wavelength LED 4126, the second-wavelength LED 4127 and the third-wavelength LED 4128 respectively emit red, green, blue light.

The complementary color element 431 is arranged on an inner surface 4521 of the supporting portions 452 of the enclosure 45. In the present embodiment, the supporting portion 452 is perpendicular to the base 451, and parallel to a side surface 423 of the light guiding plate 42. The complementary color element 431 has a number of complementary color zones. The complementary color zones are arranged alternately along a vertical line.

In the present embodiment, the complementary color element 431 includes a number of first complementary color zones 4316 and a number of second complementary color zones 4317. The first and second complementary color zones 4316, 4317 are alternately arranged and evenly spaced apart from each other, wherein the first complementary color zones 4316 are green reflective films and the second complementary color zones 4317 are blue reflective films. Therefore, red light emitted from the red LED 4126 arranged on the left end of the substrate 411 incidents to the first, second complementary color zones 4316, 4317. The first, second complementary color zones 4316, 4317 cooperatively convert the light into white light and reflect the white light into the light guide plate 42 via the side surface 423, and then white light emits from the light guiding plate 42.

Alternatively the complementary color element 431 can include other colors. For example, when the LED 4126 at the lateral sides of the substrate 411 is blue LED, and the complementary color element 431 adjacent to the LED 4126 can be yellow. Also, the LEDs 412 can include a number of first-wavelength LEDs 4126 and a number of the second-wavelength LEDs 4127.

Figure 7:
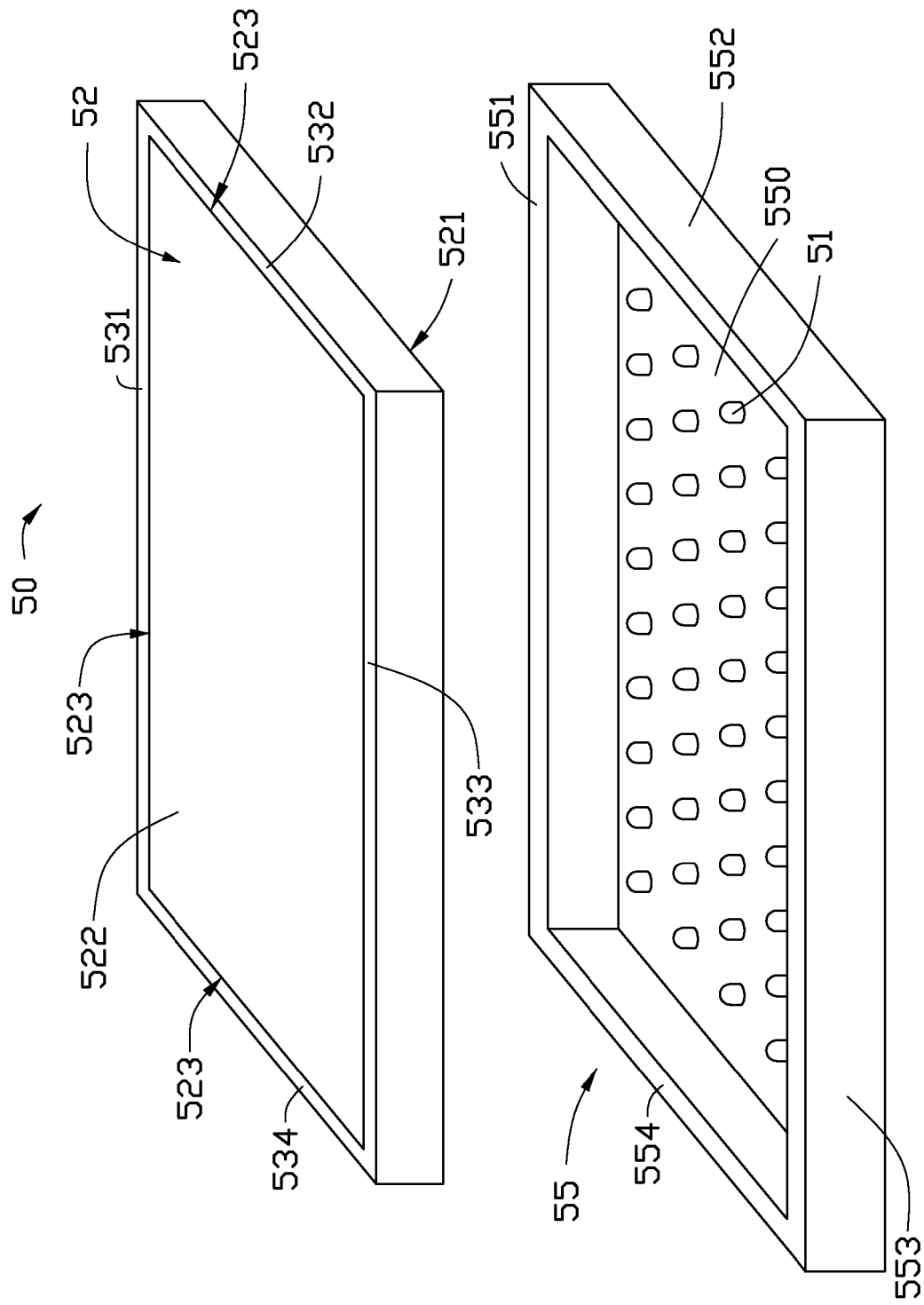
FIG. 7 is an exploded view of a direct-type backlight module, in accordance with a fifth embodiment of the present disclosure.
Figure 8:
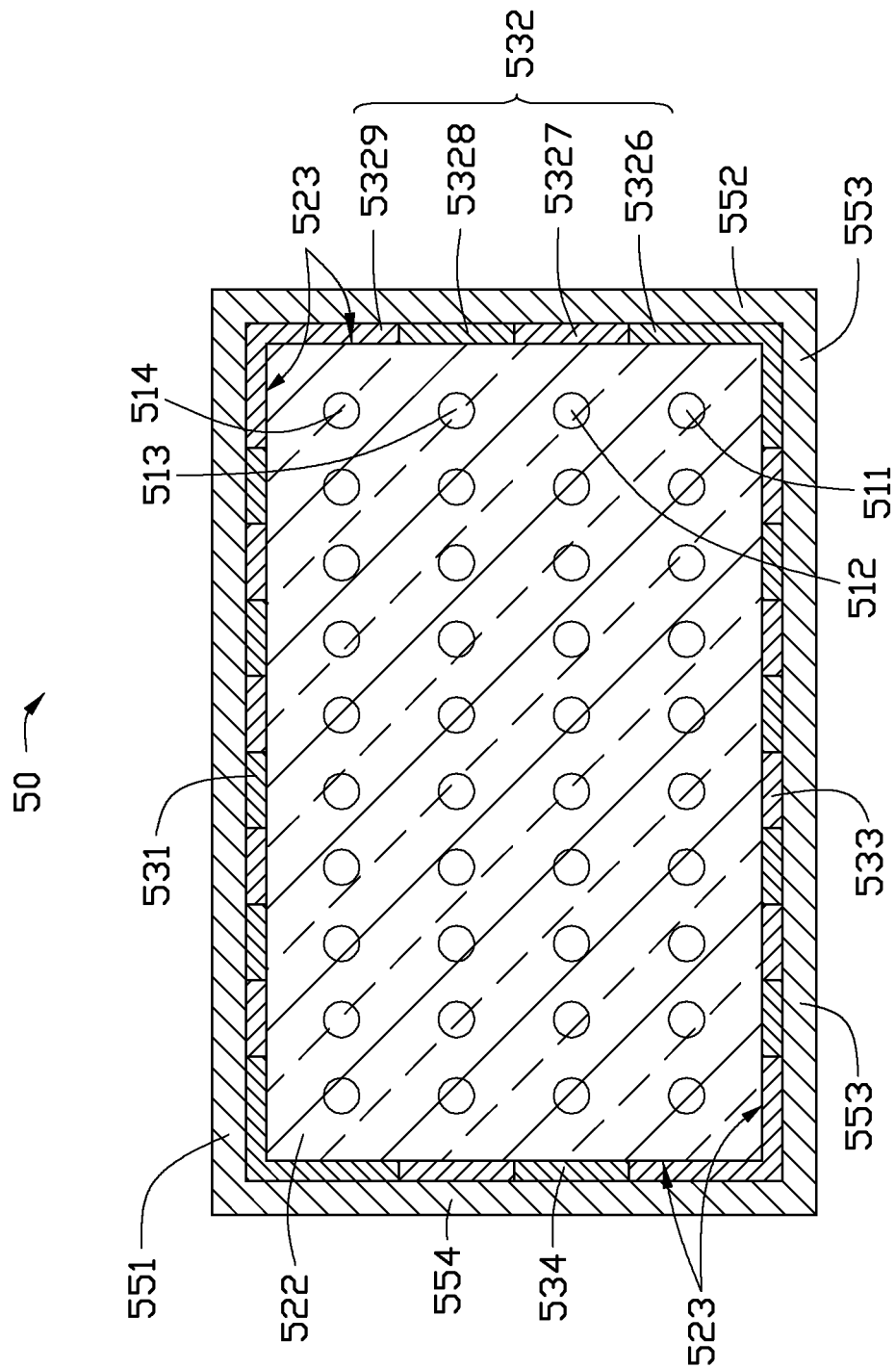
FIG. 8 is a cross-sectional view of the backlight module of FIG. 7.

Referring to FIGS. 7-8, a direct-type backlight module 50 in accordance with a fifth embodiment is shown. The direct-type backlight module 50 includes an enclosure 55, a light source 51 arranged in the enclosure 55, a light guiding plate 52 opposite to the light source 51, four complementary color elements 531, 532, 533, 534 located at side surfaces of the light guiding plate 52.

The enclosure 55 includes a base 550 and four supporting portions 551, 552, 553, 554 upwardly extending from lateral sides of the base 550. The base 550 cooperates with the supporting portions 551, 552, 553, 554 to form a hollow rectangular parallelepiped. In the present embodiment, the supporting portions 551, 552, 553, 554 are perpendicular to the base 550 and have a uniform height.

The light source 51 is received in the enclosure 55 and arranged on the base 550 of the enclosure 55. In the present embodiment, the light source 51 includes a number of LEDs arranged in an array. The LEDs emit light with different colors, and the different colors light mix with each other to gain a white light.

The light guiding plate 52 has a generally rectangular shape with a uniform height. The light guiding plate 52 includes a light input surface 521, a light output surface 522 opposite to the light input surface 521, and four side surfaces 523 perpendicular to and sandwich between the light input surface 521 and the light output surface 522. The light guiding plate 52 is received in the enclosure 55, and the light input surface 521 faces the light source 51. The side surfaces 523 of the light guiding plate 52 respectively face and are parallel to inner surfaces of the supporting portions 551, 552, 553, 554.

The complementary color elements 531, 532, 533, 534 are respectively located at the side surfaces 523 of the light guiding plate 52; therefore, inner surfaces of the complementary color elements 531, 532, 533, 534 respectively face the four side surfaces 523 of the light guiding plate 52.

In the present embodiment, the complementary color elements 531, 532, 533, 534 each have a number of complementary color zones arranged alternately in a line. The complementary color zones each have a color complementary to the color of the light generated by the adjacent, outmost LED. In the present embodiment, the complementary color element 532 includes a number of complementary color zones 5326, 5327, 5328, 5329. The complementary color zones 5326, 5327, 5328, 5329 respectively face the adjacent, outmost LEDs 511, 512, 513, 514, and complementary to the colors of the light emitted from the LEDs 511, 512, 513, 514, respectively. For example, when the LED 511 is yellow LED, the complementary color zone 5326 uses a blue reflective film. The complementary color zone 5326 receives yellow light emitted from the LED 511 and converts it into white light, and reflects the white light into the light guide plate 52 via the side surface 523 of the light guiding plate 52. Then the white light emits from the light guiding plate 52 through the light output surface 522. Therefore, the light output from the light output surface 522 of the light guiding plate 52 is uniform.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A backlight module comprising:
    a light guiding plate comprising a light input surface, a light output surface and two opposite side surfaces, the light input surface being adjacent and perpendicular to the light output surface, the two opposite side surfaces being adjacent and perpendicular to the light input surface and the light output surface;
    a light source facing the light input surface of the light guiding plate, the light source comprising a plurality of LEDs, some LEDs emitting light with a first wavelength, and other LEDs emitting light with a second-wavelength different from the first wavelength, the first wavelength light mixing with the second wavelength light and obtaining white light; and
    a complementary color element located at one of the side surfaces of the light guiding plate and adjacent to the light source, the complementary color element converting the light with the first wavelength emitted from a corresponding adjacent, outmost LED into white light, the white light being reflected by the complementary color element and emitting from the light guiding plate through the light output surface of the light guiding plate.

2. The backlight module of claim 1, wherein the complementary color element is a complementary color reflective film.

3. The backlight module of claim 1, further comprising an enclosure, the enclosure comprising a base and two opposite supporting portions extending from two lateral ends of the base, the light guiding plate being received in the enclosure, the light source being mounted on the base of the enclosure.

4. A backlight module comprising:
    a light guiding plate comprising a light input surface, a light output surface adjacent and perpendicular to the light input surface, and two side surfaces adjacent and perpendicular to the light input surface and the light output surface;
    a light source facing to the light input surface of the light guiding plate, the light source comprising a number of LEDs, the LEDs emitting light with at least two wavelengths, and the at least two wavelengths light mixing with each other to gain a white light; and
    at least two complementary color elements adjacent to the light source and respectively located at the side surfaces of the light guiding plate, the at least two complementary color elements converting the light with the first wavelength emitted from adjacent, outmost LEDs into white light, and the white light being reflected by the at least two complementary color elements and emitting from the light guiding plate through the light output surface.

* * * * *